(12) United States Patent
Chang et al.

(10) Patent No.: US 9,651,854 B2
(45) Date of Patent: May 16, 2017

(54) PROJECTOR

(71) Applicant: Coretronic Corporation, Hsin-Chu (TW)

(72) Inventors: Jui Chang, Hsin-Chu (TW); Chien-Chung Liao, Hsin-Chu (TW); Kuan-Ta Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/738,926

(22) Filed: Jun. 14, 2015

(65) Prior Publication Data

US 2016/0054646 A1    Feb. 25, 2016

(30) Foreign Application Priority Data

Aug. 21, 2014    (TW) .............................. 103128781 A

(51) Int. Cl.

| | | |
|---|---|---|
| *G03B 21/20* | (2006.01) | |
| *H04N 9/31* | (2006.01) | |
| *F21V 8/00* | (2006.01) | |
| *G02B 6/26* | (2006.01) | |
| *G02B 27/30* | (2006.01) | |
| *G02B 13/00* | (2006.01) | |

(52) U.S. Cl.
CPC ......... *G03B 21/204* (2013.01); *G02B 6/0008* (2013.01); *G02B 6/0096* (2013.01); *G02B 6/262* (2013.01); *G03B 21/208* (2013.01); *G02B 6/0005* (2013.01); *G02B 13/0095* (2013.01); *G02B 27/30* (2013.01); *H04N 9/31* (2013.01)

(58) Field of Classification Search
CPC ............ G03B 21/2013; G03B 21/2033; G03B 21/204; G03B 21/20; G03B 21/208; H04N 9/315; H04N 9/3158; H04N 9/3161; H04N 9/3164; G02B 6/0005; G02B 6/0006
USPC .................................. 362/551, 554, 553, 555
See application file for complete search history.

(56) References Cited

U.S. PATENT DOCUMENTS

| | | |
|---|---|---|
| 6,412,954 B1 | 7/2002 | Wang |
| 7,088,321 B1 | 8/2006 | Parker |
| | (Continued) | |

FOREIGN PATENT DOCUMENTS

| | | |
|---|---|---|
| CN | 101063519 | 10/2007 |
| TW | 439993 | 6/2001 |
| TW | M337114 | 7/2008 |

*Primary Examiner* — William C Dowling
*Assistant Examiner* — Ryan Howard
(74) *Attorney, Agent, or Firm* — Jianq Chyun IP Office

(57) ABSTRACT

A projector includes a light source module, an optical engine, a light valve and a projecting lens. The light source module includes light sources, optical fibers and a light integration rod. Each of the light sources provides an illumination sub-beam. Each of the illumination sub-beams transmits to the light integration rod through the corresponding optical fiber, and passes through the light integration rod and emits out to form a first illumination beam. The optical engine includes a phosphor wheel located at a transmission path of the first illumination beam and converting the first illumination beam into a second illumination beam. The light valve is located at a transmission path of the second illumination beam and converts the second illumination beam into an image beam. The projecting lens is located at a transmission path of the image beam and projects the image beam out of the projector.

5 Claims, 5 Drawing Sheets

(56) References Cited

U.S. PATENT DOCUMENTS

| | | |
|---|---|---|
| 7,532,792 B2 | 5/2009 | Skovgaard et al. |
| 2008/0316569 A1 | 12/2008 | Chen et al. |
| 2009/0034284 A1* | 2/2009 | Li .................... G03B 33/06 362/554 |
| 2009/0168025 A1 | 7/2009 | Domm |
| 2010/0074284 A1* | 3/2010 | Aizawa ............ G02B 6/0006 372/29.02 |
| 2013/0088471 A1* | 4/2013 | Kitano ............... H04N 9/3114 345/208 |
| 2014/0204558 A1 | 7/2014 | Bartlett |

* cited by examiner

PROJECTOR

CROSS-REFERENCE TO RELATED APPLICATION

This application claims the priority benefit of Taiwan application serial no. 103128781, filed on Aug. 21, 2014. The entirety of the above-mentioned patent application is hereby incorporated by reference herein and made a part of this specification.

BACKGROUND OF THE INVENTION

Field of the Invention

The invention relates to an optical device, and particularly relates to a projector.

Description of Related Art

A projector is a display device used to produce images. A projector is to convert an illumination beam produced by a light source into an image beam by using a light valve, and then project the image beam onto a screen or a wall through a projection lens to form an image.

Generally, a projector has a light source module for providing the light necessary for the projected image. FIG. 6 is a schematic diagram of a conventional projector 600. The projector 600 includes a light source module 610 and an optical engine 620, wherein the light source module 610 includes a plurality of light sources 612, a combiner 614 and a collimator lens 616, and the optical engine 620 includes a phosphor wheel 622 and a plurality of relay lenses 624. The light sources 612, for example, use a plurality of blue light laser diodes, and the blue light emitted by the plurality of blue light laser diodes are concentrated and transmitted to the collimator lens 616 through the combiner 614, then the blue light is transmitted to the phosphor wheel 622 through the relay lens 624 or other type of optical component, such that a portion of the blue light is converted into red light and green light by the phosphor wheel 622. To increase the brightness of the projected image, typically the number of laser diodes will be increased in the projector design. However, with the increase in the number of laser diodes, the size of the combiner 614 increases correspondingly, for effectively concentrating the blue light emitted by the laser diodes. This may increase the manufacturing cost of the light source module 610. Additionally, with the increase in size of the combiner 614, light beams emitted by a portion of the laser diodes need a larger bending angle for transmission toward the collimator lens 616 after passing through the combiner 614, therefore the difficulty in design of the light source module 610 is greatly increased.

Taiwan patent number TWM337114 discloses an illumination system, where the light emitted by the light source of the illumination system sequentially passes through the integration rod and the focus unit to arrive at the color wheel. China patent number CN101063519 discloses an illumination system, where the illumination system utilizes optical fibers for guiding the light emitted from the light source. United States patent publication number US20090168025 discloses an illumination system, where the light emitted by the light source of the illumination system passes through optical fibers to arrive at the integrator. Taiwan patent number TW439993 discloses integration rods which can be hollow integration rods or solid integration rods.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention was acknowledged by a person of ordinary skill in the art.

SUMMARY OF THE INVENTION

The invention provides a projector which has a lower manufacturing cost and lower difficulty of design in the light source module, and the light source module could provide a uniform illumination beam to the phosphor wheel.

To achieve at least one of the objects and advantages, and in accordance with the purpose of the invention, as embodied and broadly described herein, an embodiment of the invention provides a projector including a light source module, an optical engine, a light valve and a projecting lens. The light source module is adapted to provide a first illumination beam and includes a plurality of light sources, a plurality of optical fibers and a light integration rod. Each of the light sources is adapted to provide an illumination sub-beam. Each of the optical fiber has a first end and a second end corresponding to the first end, wherein the first ends are respectively aligned to the light sources. The light integration rod has a light input end and a light output end, wherein the second ends are aligned to the light input end. Each of the illumination sub-beams is transmitted to the light input end by the corresponding optical fiber and passes through the light integration rod and emits out of the light output end, so as to form a first illumination beam. The optical engine includes a phosphor wheel, wherein the phosphor wheel is located at the transmission path of the first illumination beam, and the phosphor wheel is adapted to convert the first illumination beam into a second illumination beam. The light valve is located at the transmission path of the second illumination beam and is adapted to covert the second illumination beam into an image beam. The projector lens is located at the transmission path of the image beam and is adapted to project the image beam out of the projector.

According to another embodiment of the invention, the light source module comprises a bunching unit, and the second ends are bunched by the bunching unit.

According to another embodiment of the invention, the light integration rod is a hollow rod, the bunching unit and at least a part of the second ends are located inside the hollow rod.

According to another embodiment of the invention, a cross-section of the light integration rod is a rectangle.

According to another embodiment of the invention, the light source module comprises at least one collimator relay lens, the at least one collimator relay lens is aligned to the light output end, and the first illumination beam passes through the at least one collimator relay lens and transmits toward the phosphor wheel.

According to another embodiment of the invention, each of the light sources comprises a laser diode and a collimator lens, the laser diode is adapted to emit the illumination sub-beam, and the illumination sub-beam passes through the collimator lens and transmits toward the corresponding first end.

According to another embodiment of the invention, each of the light sources further comprises a coupling lens located between the collimator lens and the first end, and the illumination sub-beam passing through the collimator lens is adapted to be guided into the first end by the coupling lens.

Based on the above, in the light source module of the invention, the illumination sub-beams emitted by a plurality of light sources are concentrated to the light integration rod by the guidance of a plurality of optical fibers respectively, not by the combiner. Therefore, the light source module does not require a large-sized combiner when the number of light sources is increased, and the illumination sub-beams would not have a larger bending angle for transmission after passing through a large-sized combiner as used in the conventional projector. This could reduce manufacturing cost of the light source module and lower the difficulty in design of the light source module. Additionally, after the illumination sub-beams are concentrated by the optical fibers and pass through the light integration rod, the distribution of the illumination sub-beams will be homogenized by the light integration rod and can provide a homogeneous illumination beam to the phosphor wheel, allowing the projector to have good projection effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
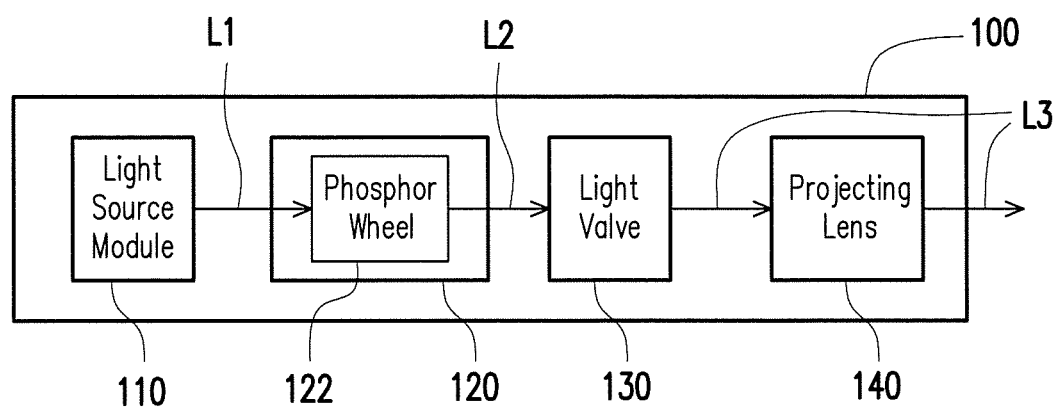
FIG. 1 is a block diagram of a projector in an embodiment of the invention.
Figure 2:
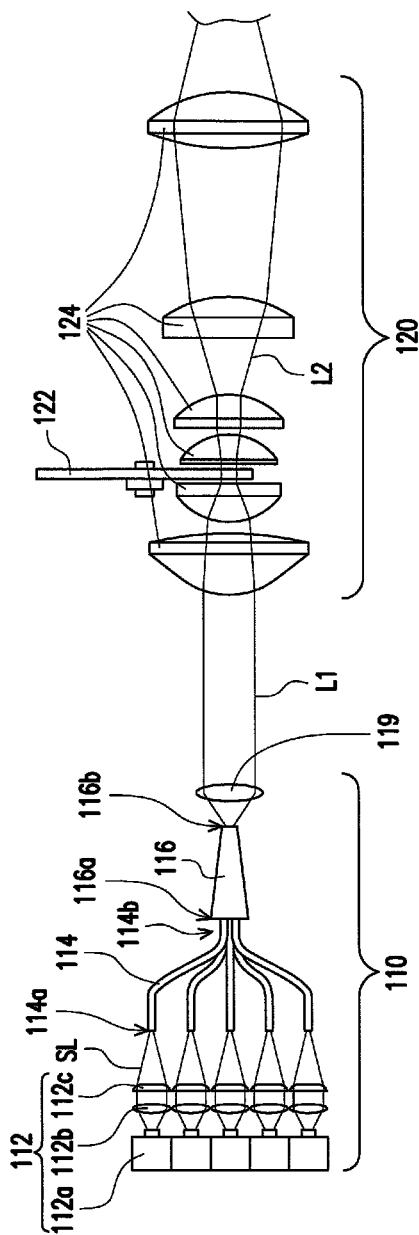
FIG. 2 is a schematic diagram of the projector of FIG. 1.

FIG. 1 is a block diagram of a projector in an embodiment of the invention. FIG. 2 is a schematic diagram of the projector of FIG. 1. Referring to FIG. 1 and FIG. 2, the projector 100 in the embodiment includes a light source module 110, an optical engine 120, a light valve 130 and a projecting lens 140. The light source module 110 is adapted to provide a first illumination beam L1, wherein the light source module 110, for example, is a blue laser light source and the first illumination beam L1 is a blue light provided by the light source module 110. The optical engine includes a phosphor wheel 122, and the phosphor wheel 122 is located at the transmission path of the first illumination beam L1 and adapted to convert the first illumination beam L1 into a second illumination beam L2. The phosphor wheel 122, for example, converts a portion of the blue light to red light and green light to form the second illumination beam L2. The light valve 130 is located at the transmission path of the second illumination beam L2 and adapted to convert the second illumination beam L2 to an image beam L3. The projecting lens 140 is located at the transmission path of the image beam L3 and adapted to project the image beam L3 out of the projector 100.

The light source module 110 of the embodiment as shown in FIG. 2 includes a plurality of light sources 112, a plurality of optical fibers 114 (five light sources 112 and five optical fibers 114 are schematically illustrated in FIG. 2, but the number is not limited thereto), and a light integration rod 116. Each of the light sources 112 includes a laser diode 112a, a collimator lens 112b and a coupling lens 112c. Each of the optical fibers 114 has a first end 114a and a second end 114b opposite to the first end 114a, and the first end 114a of each of the optical fibers 114 is exemplarily aligned to the coupling lens of each of the light sources 112. The laser diode 112a of each of the light sources 112 is adapted to provide an illumination sub-beam SL. The illumination sub-beam SL passes through the collimator lens 112b and transmits toward the first end 114a of the corresponding optical fiber 114, and is preferably guided into the first end 114a by the coupling lens 112c to increase the light utilization.

In the embodiment shown in FIG. 2, the light integration rod 116 has a light input end 116a and a light output end 116b. The second end 114b of each of the optical fibers 114 is aligned to the light input end 116a of the light integration rod 116. The illumination sub-beam SL provided by each of the light sources 112 is adapted to be transmitted to the light input end 116a of the light integration rod 116 by the corresponding optical fiber 114, and passes through the light integration rod 116 and emits out of the light output end 116b, so as to form the first illumination beam L1.

In the arrangement of the light source module 110 mentioned above, the illumination sub-beams SL emitted by the light sources 112 are concentrated to the light integration rod 116 by the guidance of optical fibers 114 respectively, not by the conventional combiner. Therefore, the light source module 110 does not require a large-sized combiner when the number of light sources is increased, and the illumination sub-beam SL would not have a larger bending angle for transmission after passing through a large-sized combiner as used in the conventional projector. This could reduce manufacturing cost of the light source module 110 and lower the difficulty in design of the light source module 110. Additionally, after the illumination sub-beams SL are concentrated by the optical fibers 114 and pass through the light integration rod 116, the distribution of the illumination sub-beams SL would be homogenized by the light integration rod and can provide a homogeneous first illumination beam L1 to the phosphor wheel 122, allowing the projector 100 to have good projection effect.

Figure 3A:
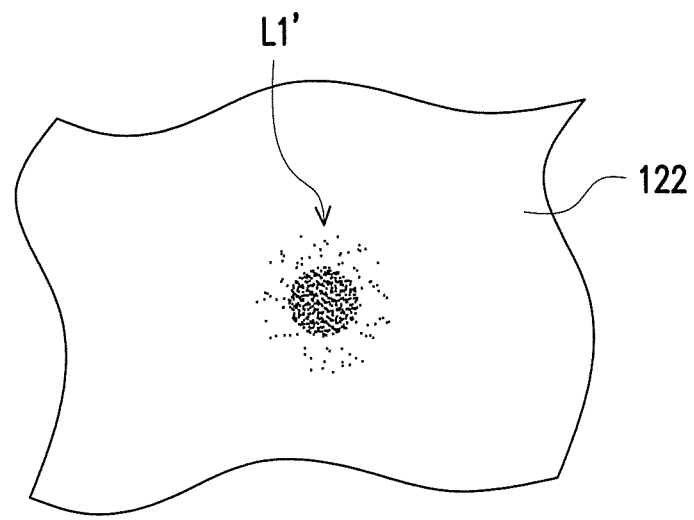
FIG. 3A illustrates the distribution of the first illumination beam on the phosphor wheel when the light source module is not arranged with a light integration rod.
Figure 3B:
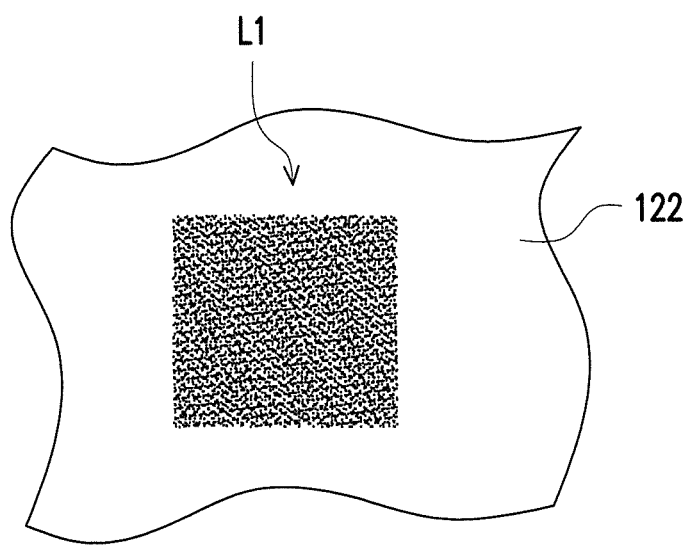
FIG. 3B illustrates the distribution of the first illumination beam on the phosphor wheel when the light source module is arranged with a light integration rod.

The homogenization effect of the light integration rod 116 for the first illumination beam L1 is described below with reference of figures. FIG. 3A illustrates the distribution of the first illumination beam on the phosphor wheel when the light source module is not arranged with a light integration rod, and FIG. 3B illustrates the distribution of the first illumination beam on the phosphor wheel when the light source module is arranged with a light integration rod. Referring to FIG. 2, FIG. 3A and FIG. 3B, when the light source module 110 is not arranged with a light integration rod, the distribution of the first illumination beam L1' on the phosphor wheel 122 is more concentrated and not homogeneous as shown in FIG. 3A. In the embodiments of the invention, the first illumination beam L1 could be homogenized by the light integration rod 116 through the arrangement of the light integration rod 116, such that the distribution of the first illumination beam L1 on the phosphor wheel 122 is more homogeneous as shown in FIG. 3B. This would avoid the phosphor wheel 122 burning due to the beam distribution being overly concentrated.

Figure 4:
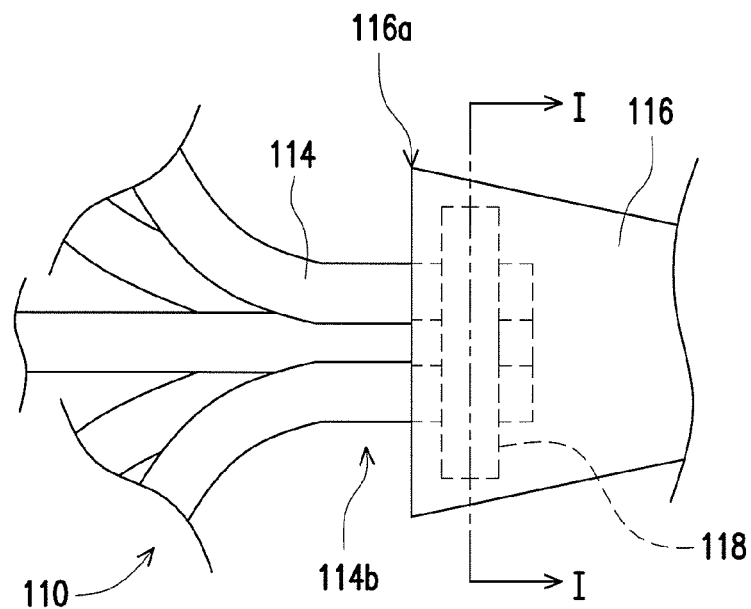
FIG. 4 is a partially enlarged schematic diagram of the light source module of FIG. 2.
Figure 5:
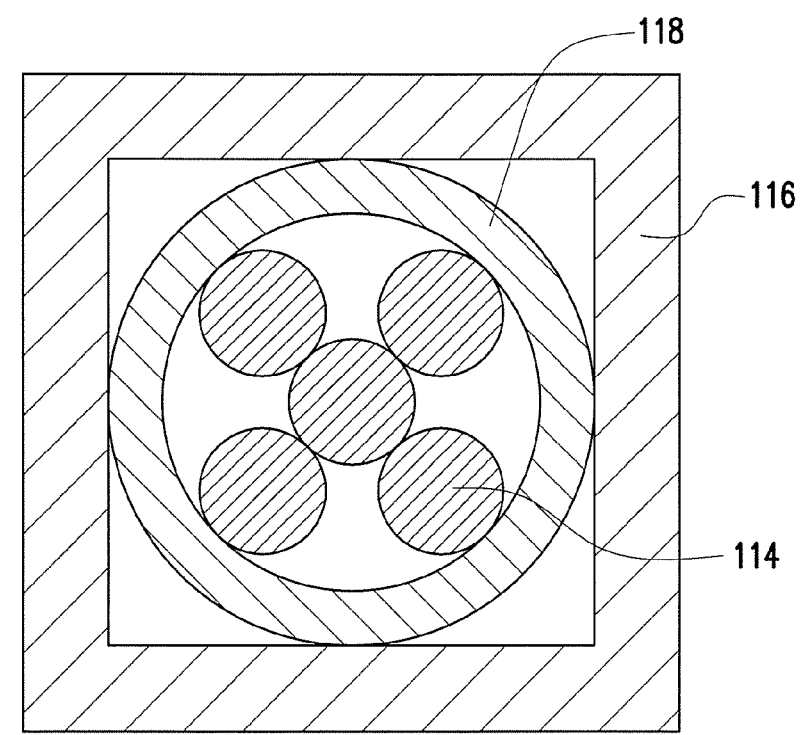
FIG. 5 is a cross-sectional view of the light source module along the line I-I in FIG. 4.
Figure 6:
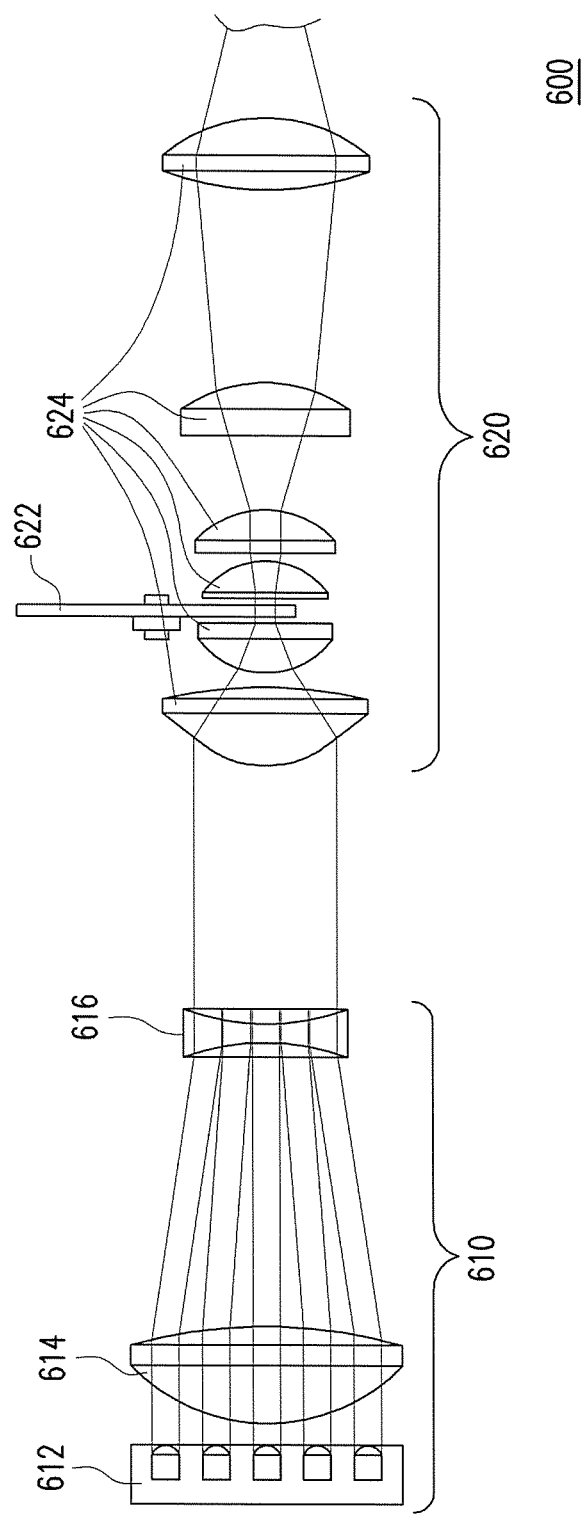
FIG. 6 is a schematic diagram of a conventional projector.

FIG. 4 is a partially enlarged schematic diagram of the light source module of FIG. 2. FIG. 5 is a cross-sectional view of the light source module along the line I-I in FIG. 4. Referring to FIG. 4 and FIG. 5, in the embodiment, the light integration rod 116, for example, is a hollow rod and the cross-section of the hollow rod is a rectangle (as shown in FIG. 5). The light source module 110 further includes a bunching unit 118. The bunching unit 118, for example, is a metallic ring or other suitable bunching structure. The second ends 114b of the optical fibers 114 are bunched by the bunching unit 118. The bunching unit 118 and at least a portion of the second ends 114b are located inside the hollow rod and fixed to the light input end 116a of the light integration rod 116. In other embodiments, light integration rod 116 could be a solid rod and the bunching unit 118 and the second ends 114b could be fixed to the light input end of the solid rod by other suitable arrangements, and the invention does not limit thereto.

In the embodiment, the cross-section of the light integration rod 116 is preferably a rectangle and is not axially symmetric. After each of the illumination sub-beams SL shown in FIG. 2 enters the integration rod 116 from the corresponding second end 114b of the optical fiber 114, the axially symmetric distribution of each of the illumination sub-beams SL could be effectively disturbed by the light integration rod 116 having non-axially symmetric cross-section, for producing more homogeneous illumination beam L1. In other embodiments, the cross-section of light integration rod 116 could be a circular shape, hexagonal shape, or other suitable shapes, and the invention does not limit thereto.

Referring to FIG. 2, the light source module 100 of the embodiment further includes a collimator relay lens 119. The collimator relay lens 119 is aligned to the light output end 116b of the light integration rod 116. The optical engine 120 includes a plurality of relay lenses 124. The first illumination beam L1 emitting from the light output end 116b of the light integration rod 116 passes through the collimator relay lens 119 of the light source module 110 and part of the relay lenses 124 of the optical engine 120 and transmits toward the phosphor wheel 122. After the first illumination beam L1 is converted into the second illumination beam L2 by the phosphor wheel 122, it passes through another part of relay lenses 124 of the optical engine 120 and transmits toward the light valve 130 as shown in FIG. 1.

In other embodiments, the light source module 110 shown in FIG. 2 could be applied to optical engines of other forms, and the invention does not limit thereto. For example, the optical engine 120 could be either the transmissive type via the arrangements of the relay lenses 124 and the phosphor wheel 122 as shown in FIG. 2, or the reflective type via the arrangement of the relay lenses 124 and the phosphor wheel 122 with reflective elements and optical splitting elements according to design requirements.

In summary, in the light source module of the invention, the illumination sub-beams emitted by a plurality of light sources are concentrated to the light integration rod by the guidance of a plurality of optical fibers respectively, not by a combiner. Therefore, the light source module does not require a large-sized combiner when the number of light sources is increased, and the illumination sub-beam would not have a larger bending angle for transmission after passing through a large-sized combiner as used in the conventional projector. This could reduce manufacturing cost of the light source module and lower the difficulty in design of the light source module. Additionally, after the illumination sub-beams are concentrated by the optical fibers and pass through the light integration rod, the distribution of the illumination sub-beams will be homogenized by the light integration rod and can provide a homogeneous illumination beam to the phosphor wheel, allowing the projector to have good projection effect. Further, in the preferable embodiment, the cross-section of the light integration rod could be an non-axially symmetric shape, therefore after each of the illumination sub-beams SL enters the integration rod from the second end of the corresponding optical fiber, the axially symmetric distribution of each of the illumination sub-beams SL could be effectively disturbed by the light integration rod having non-axially symmetric cross-section, for producing more homogeneous illumination beam and enhancing the projection effect of the projector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
a light source module, adapted to provide a first illumination beam and comprises:
   a plurality of light sources, each of the light sources provides an illumination sub-beam;
   a plurality of optical fibers, each of the optical fibers has a first end and a second end opposite to each other, and the first ends are respectively aligned to the light sources;
   a light integration rod, having a light input end and a light output end opposite to the light input end, wherein a cross-section of the light integration rod is a rectangle, the second ends are aligned to the light input end, and each of the illumination sub-beams is adapted to transmit to the light input end through the corresponding optical fiber and pass through the light integration rod and emit out of the light output end, so as to form the first illumination beam; and
   a ring-shaped bunching unit, and the second ends are bunched by the ring-shaped bunching unit, wherein the ring-shaped bunching unit and the second ends are fixed to the light input end of the light integration rod;
an optical engine, comprising a phosphor wheel, wherein the phosphor wheel is located at a transmission path of the first illumination beam, and the phosphor wheel is adapted to convert the first illumination beam into a second illumination beam;
a light valve, located at a transmission path of the second illumination beam and is adapted to convert the second illumination beam into an image beam; and
a projecting lens, located at a transmission path of the image beam and is adapted to project the image beam out of the projector.

2. The projector as claimed in claim 1, wherein the light integration rod is a hollow rod, the ring-shaped bunching unit and at least a part of the second ends are located inside the hollow rod.

3. The projector as claimed in claim 1, wherein the light source module comprises at least one collimator relay lens, the at least one collimator relay lens is aligned to the light output end, and the first illumination beam passes through the at least one collimator relay lens and transmits toward the phosphor wheel.

4. The projector as claimed in claim 1, wherein each of the light sources comprises a laser diode and a collimator lens, the laser diode is adapted to emit the illumination sub-beam, and the illumination sub-beam passes through the collimator lens and transmits toward the corresponding first end.

5. The projector as claimed in claim 4, wherein each of the light sources further comprises a coupling lens located between the collimator lens and the first end, and the illumination sub-beam passing through the collimator lens is adapted to be guided into the first end by the coupling lens.

* * * * *